Aug. 2, 1960 D. BERLIN 2,947,546
COLLAPSIBLE SHOPPING CART
Filed Oct. 17, 1957

*INVENTOR.*
DANIEL BERLIN
BY *Harry Langrana*
*Stanley Bilken*
ATTORNEYS

United States Patent Office 2,947,546
Patented Aug. 2, 1960

2,947,546

COLLAPSIBLE SHOPPING CART

Daniel Berlin, 4424 Paul St., Philadelphia 24, Pa.

Filed Oct. 17, 1957, Ser. No. 690,696

2 Claims. (Cl. 280—36)

My invention relates to a collapsible cart and more particularly relates to a collapsible shopping cart commonly used to receive, store and transport articles or parcels during marketing or similar activities.

In the present day mode of living, with small apartments or houses in which storage space is at a premium, it has become increasingly necessary to use compact, convertible and collapsible devices, whereby one device may do the work of several. Furthermore, when such a device is not in use at all, it is desirable for it to have the capacity to be collapsed or folded into a small compact unit which will occupy but a small storage space. With the advent of suburban living and widely separated shopping centers, it is the custom for the shopper to bring along a shopping cart which may conveniently be carried in an automobile to the market center. These shopping carts must of necessity be sturdy in construction and of large capacity in order to accommodate a considerable volume of parcels which are purchased in the various stores within the center and transported therebetween during the shopping tour.

While numerous carts of this nature have been previously manufactured, such carts have been found to be wanting because their complicity of structure which makes manufacture expensive or because of their intricate folding construction presenting problems to the user.

Although it is primarily for shopping use that the present invention has been designed, the device may just as well be used for many other purposes in its original state, and may easily be converted to serve further uses when desired.

The assembly of prior collapsible carts required a great number of welds to hold the wire of the side walls together in order to obtain a reticulated structure whereby packages inserted within the basket would not fall out. As is easily understood welding each one of the wire elements to an adjacent wire element required a great deal of time and therefore increased the expense of manufacturing of such shopping carts.

It is, therefore, an object of my invention to provide a sturdy shopping cart which may easily be collapsed into a small storage space.

Another object of my invention is to construct a collapsible shopping cart whose arrangement of parts are such as to provide for ease of economical manufacture, requiring a minimum of welded components, and which is adapted for larger scale production.

Another object of my invention is to provide a collapsible shopping cart wherein an efficient and simple manner of folding is afforded.

Another object of my invention is to provide a collapsible shopping cart which is useful for many purposes in its original state and which may easily be converted to serve additional purposes.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing, in which.

Referring now in greater detail to the drawings in which similar reference characters refer to similar parts, I show a collapsible cart comprising a foldable basket section, generally designated as A, hinged to and slidable upon a frame, generally designated as B.

Figure 1:
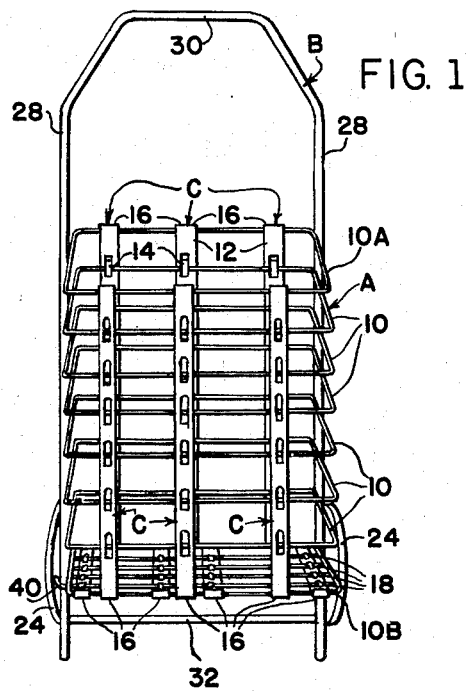
Fig. 1 is a front perspective view of a collapsible shopping cart embodying my invention.
Figure 2:
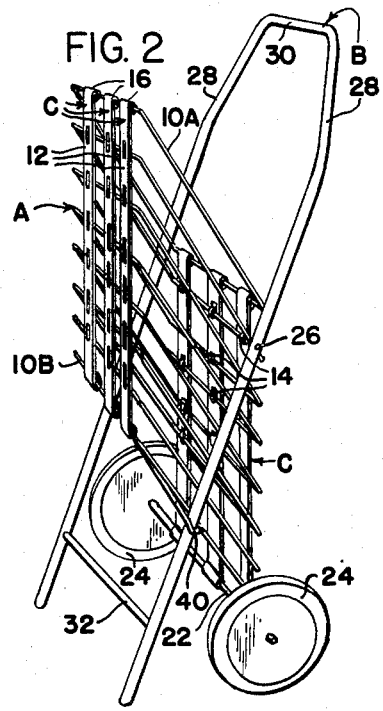
Fig. 2 is a side perspective view thereof, the cart being in partially collapsible position.

The basket section A comprises a plurality of wire ribs 10 each of which is formed into a continuous rectangular configuration and held in spaced relationship with each other by a plurality of vertical stringers C. It is to be observed that there are no welds in the formation of the wire ribs themselves or in their attachment to the stringers C.

Each of the stringers C comprises a sheet metal strip 12 from which a plurality of uncinated tabs 14 have been punched. The ends of each of the metal strips 12 have an eyelet 16 integrally rolled therefrom. The upper eyelet 16 on each of the strips is curled about the uppermost wire rib 10A and the lower eyelet 16 is curled about the lowermost wire rib 10B. The uncinated tabs 14 are each curled about the intermediate wire ribs 10 to maintain each of the ribs in spaced relationship with each other and in pivotal engagement with the stringers C at the front and back portions of the basket. The stringers C are maintained in spaced relationship with each other by staking the upper and lower wire ribs 10A and 10B on each side of the respective eyelets 16.

Figure 3:
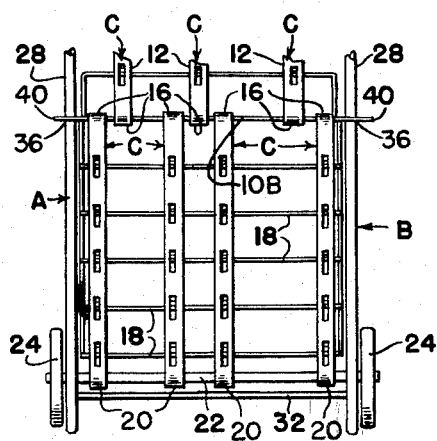
Fig. 3 is a side elevational view of the cart in fully collapsed position.
Figure 4:
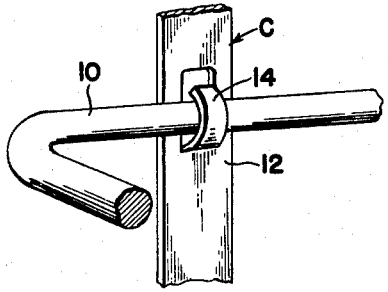
Fig. 4 is a fragmentary view showing the construction of the basket wire rib and stringer detail.

The lowermost wire rib 10B has a plurality of spaced wire struts 18 extending from one side to the other side of the rib and held thereupon by welding. A plurality of the stringers C are secured across the bottom of the lowermost rib 10B maintaining the struts 18 in spaced relationship by engagement thereof by the tabs 14 respectively to define a reticulated bottom 21. An axle 22 is also secured within the eyelets 20 of bottom stringers C adjacent to the rear side of the lowermost rib 10B. Suitable ground engaging wheels 24 are rotatably supported upon each end of the axle 22 and provide means for rolling the cart about. It is to be noted that the basket A is pivotally supported at the axle 22 and also about the frame B at 26 whereby the rear of the basket is held in substantially the same plane as the front of the basket when the basket is in the fully collapsed position of Fig. 3.

The frame B is generally U-shaped in construction having a pair of tubular legs 28 downwardly extending and integrally formed and secured to a handle portion 30. The upper interior portion of each leg 28 has a hole therein for pivotally supporting the basket A. The uppermost rib 10 has a pin 26 extending outwardly from each side thereof, the pins being pivotally supported within the holes at the opposite interior portions of the legs 28 within the frame B. At the lower leg portion of the frame B is a lateral reinforcing brace 32 which interconnects the legs 28 and provides support for the basket A when it is in extended open position. A sliding bracket 36 is secured to each side of the lowermost rib 10B at its forward portion and each has a looped end 40 which encircles the legs 28 of the frame B and is slideable thereon.

As is apparent from the foregoing description, my collapsible cart may be easily assembled without welding operations. The front and rear portions of the basket are maintained in parallel planes with each other in either collapsed or open position as a result of the spaced pivotal engagement of the ribs 10 with the tabs 14 of the stringers C. The stringers not only integrate the rectangular ribs during the collapsing or opening operations thereof, but also act as lattice work to prevent articles from falling out of the basket when the cart is in open position. Since the rear upper portion of the basket A is pivotally secured to the frame B and the front lower portion of the basket is slideably supported on the frame, it is easily seen that the entire cart may be efficiently collapsed by pulling upwardly upon the front of the basket until all of the ribs 10 are substantially in a single plane within the frame B.

Although my invention has been described in considerable detail, such description is intended as being illustrative rather than limiting, since the invention may be variously embodied, and the scope of the invention is to be determined as claimed.

I claim as my invention:

1. A collapsible cart comprising a foldable basket and a U-shaped tubular frame, said basket comprising a plurality of vertically spaced wire ribs of rectangular configuration, and a plurality of flat vertical stringers pivotally secured to the front and back portions of each of said ribs, said stringers having a plurality of spaced uncinated tabs curled about said wire ribs in vertically spaced relationship therewith, one of said ribs having pins extending outwardly from the sides thereof, said pins being in pivotal engagement with said frame to pivotally secure said basket to said frame, one of said ribs having secured thereto at the sides thereof brackets adapted for sliding engagement with said frame, and the lowermost of said ribs having a plurality of spaced struts secured thereto to form a bottom.

2. The collapsible cart of claim 1 wherein said struts are spaced by means of a plurality of stringers to define a reticulated bottom, said stringers having at one end thereof eyelets which revolvably retain an axle and a pair of ground engaging wheels secured to said axle.

References Cited in the file of this patent

UNITED STATES PATENTS

| 937,422 | Collas | Oct. 19, 1909 |
| 1,076,623 | Bond | Oct. 21, 1913 |
| 2,236,922 | Schutt | Apr. 1, 1941 |
| 2,438,829 | Skolnik | Mar. 30, 1948 |
| 2,468,604 | Salat | Apr. 26, 1949 |

FOREIGN PATENTS

| 473,915 | Canada | May 29, 1951 |
| 909,446 | Germany | Apr. 22, 1954 |